Figure 1:
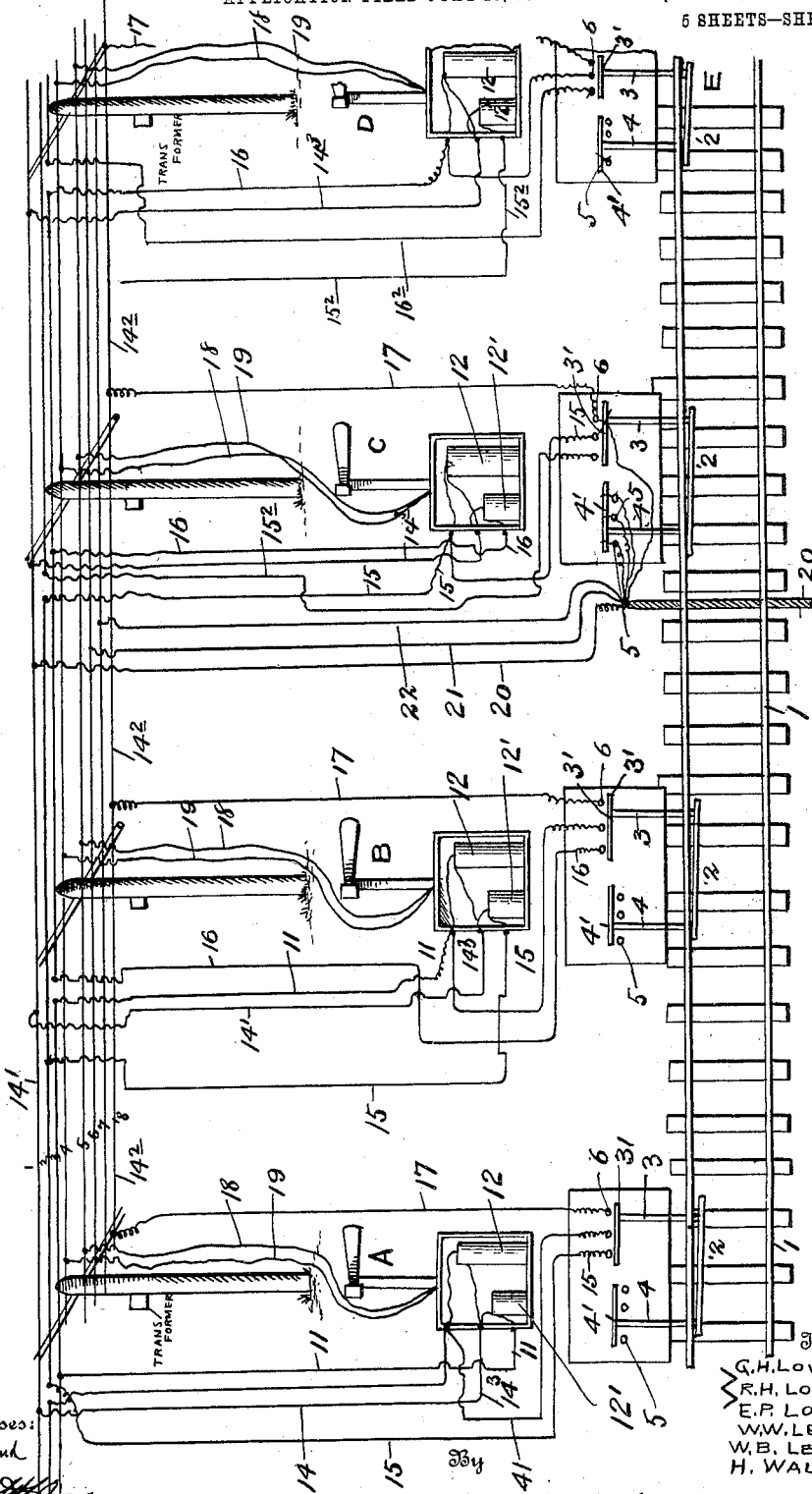

No. 793,671. PATENTED JULY 4, 1905.
G. H., R. H. & E. P. LOWER, W. W. & W. B. LEE & H. WALKER.
ELECTRIC AUTOMATIC BLOCK SYSTEM FOR RAILWAYS.
APPLICATION FILED JULY 23, 1904.

5 SHEETS—SHEET 2.

Witnesses:
Franck L. Onward
[signature]

Inventors
G. H. LOWER.
R. H. LOWER.
E. P. LOWER.
W. W. LEE.
W. B. LEE.
H. WALKER.

By [signature]
Attorney

No. 793,671. PATENTED JULY 4, 1905.
G. H., R. H. & E. P. LOWER, W. W. & W. B. LEE & H. WALKER.
ELECTRIC AUTOMATIC BLOCK SYSTEM FOR RAILWAYS.
APPLICATION FILED JULY 23, 1904.

5 SHEETS—SHEET 3.

Witnesses:
Franck L. Ourand
[signature]

Inventors
G. H. LOWER,
R. H. LOWER,
E. P. LOWER,
W. W. LEE,
W. B. LEE,
H. WALKER,
By John S. Duffie
Attorney.

No. 793,671. PATENTED JULY 4, 1905.
G. H., R. H. & E. P. LOWER, W. W. & W. B. LEE & H. WALKER.
ELECTRIC AUTOMATIC BLOCK SYSTEM FOR RAILWAYS.
APPLICATION FILED JULY 23, 1904.

5 SHEETS—SHEET 4.

Witnesses:
Franck L. Onrand.
[signature]

Inventor
G. H. LOWER,
R. H. LOWER,
E. P. LOWER,
W. W. LEE,
W. B. LEE,
H. WALKER.

By John S. Duffie Attorney

No. 793,671. PATENTED JULY 4, 1905.
G. H., R. H. & E. P. LOWER, W. W. & W. B. LEE & H. WALKER.
ELECTRIC AUTOMATIC BLOCK SYSTEM FOR RAILWAYS.
APPLICATION FILED JULY 23, 1904.
5 SHEETS—SHEET 5.
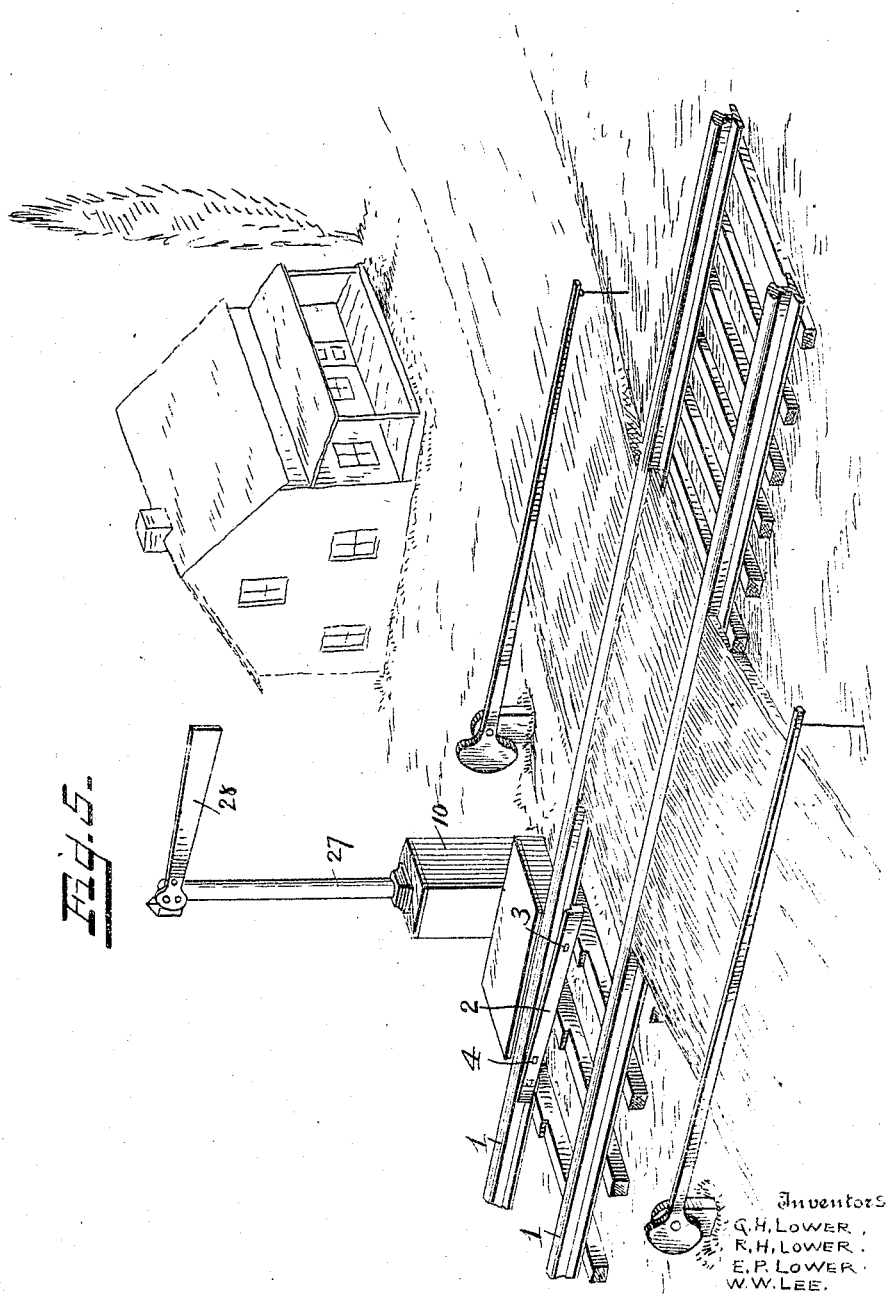

No. 793,671. Patented July 4, 1905.

UNITED STATES PATENT OFFICE.

GEORGE H. LOWER, ROBERT H. LOWER, EDWARD P. LOWER, WINFREY W. LEE, WILLIAM B. LEE, AND HERBERT WALKER, OF HOT SPRINGS, ARKANSAS.

ELECTRIC AUTOMATIC BLOCK SYSTEM FOR RAILWAYS.

SPECIFICATION forming part of Letters Patent No. 793,671, dated July 4, 1905.

Application filed July 23, 1904. Serial No. 217,855.

*To all whom it may concern:*

Be it known that we, GEORGE H. LOWER, ROBERT H. LOWER, EDWARD P. LOWER, WINFREY W. LEE, WILLIAM B. LEE, and HERBERT WALKER, citizens of the United States, residing at Hot Springs, in the county of Garland and State of Arkansas, have invented new and useful Improvements in Electric Automatic Block-Signals for Railways, of which the following is a specification.

Our invention relates to electric automatic block-signals for railways.

The object of the invention is to provide semaphores or other signals which shall be set to "danger" and "safety" automatically as a train enters the block and to lock said semaphore or signal in such position until it is automatically unlocked by electric or other connections—

First, to be used on single or double track by railroad-trains in going in either direction.

Second, to be conducted by the alternating current of two hundred and twenty volts sixty cycles, consisting of sixteen amperes to each block.

Third, to be fed by a 10 K. W. alternating-current transformer at two thousand two hundred volts with parallel machine at intervals of every fifty or sixty miles with one 3 K. W. transformer to each block and each block to contain one sixteen-candle-power globe for signal purposes.

Fourth, the blocks to be operated by the flanges on the wheels of the moving trains coming into contact with a "switch" at each block, the entire device to be operated as shown in the drawings and expressed in the specification and claims.

Fifth, to be operated with eight copper wires, as per drawings, 1 and 8 to be used as feed-wires. 2 and 3 are used to operate the semaphores or signal-boards by trains going east.

Sixth. 4 and 5 are to be used for lighting signals and stations.

Seventh. 6 and 7 are to operate the semaphores or signal-boards by trains going west.

Eighth. The invention is operated by switches set along the track or tracks at intervals.

Figure 2:
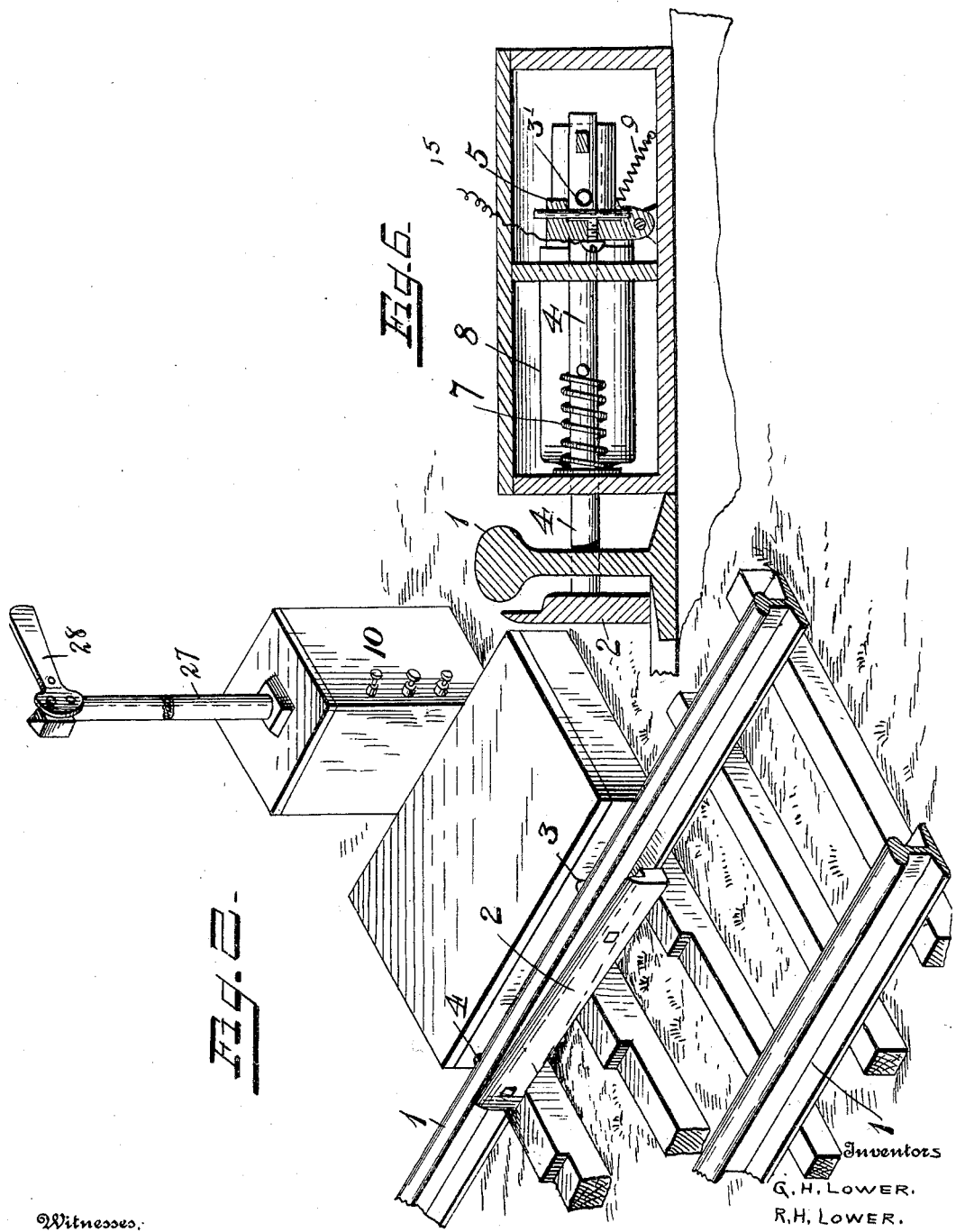
Figure 3:
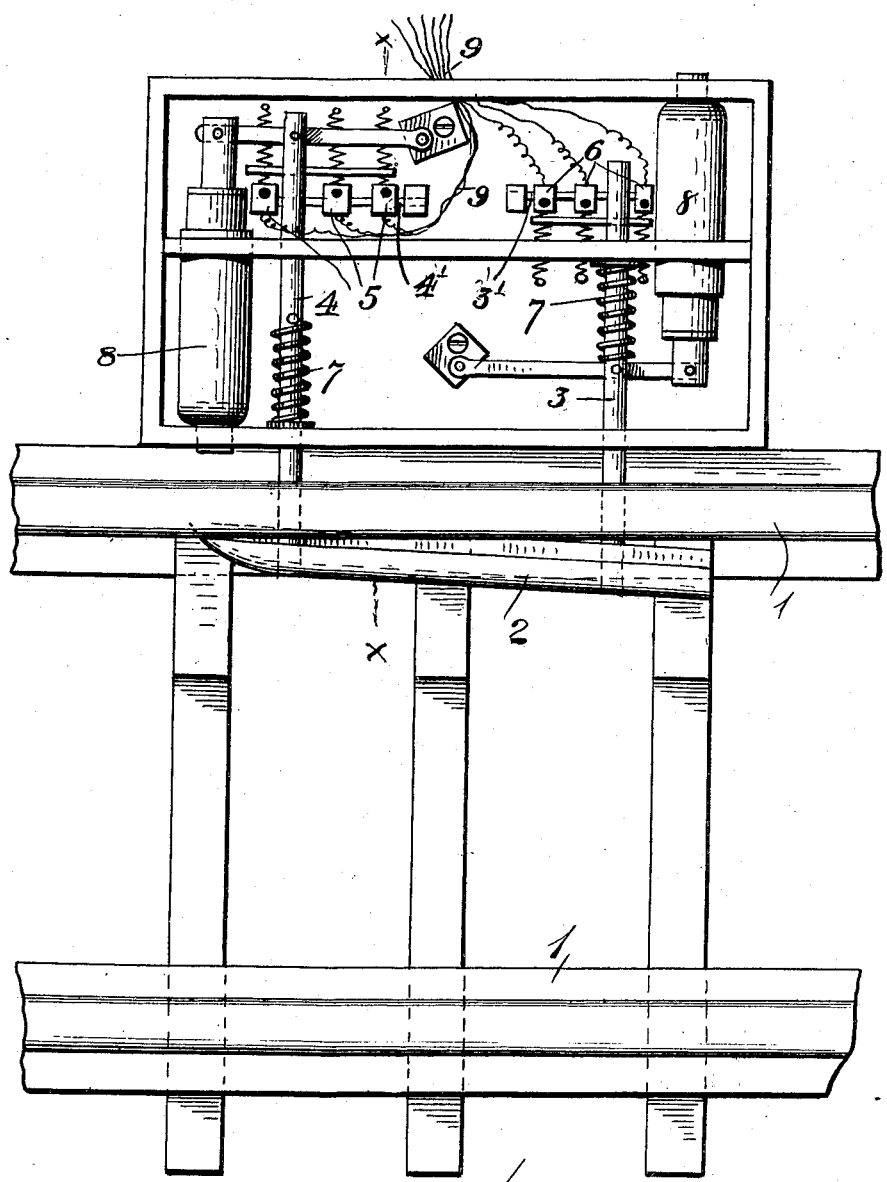
Figure 4:
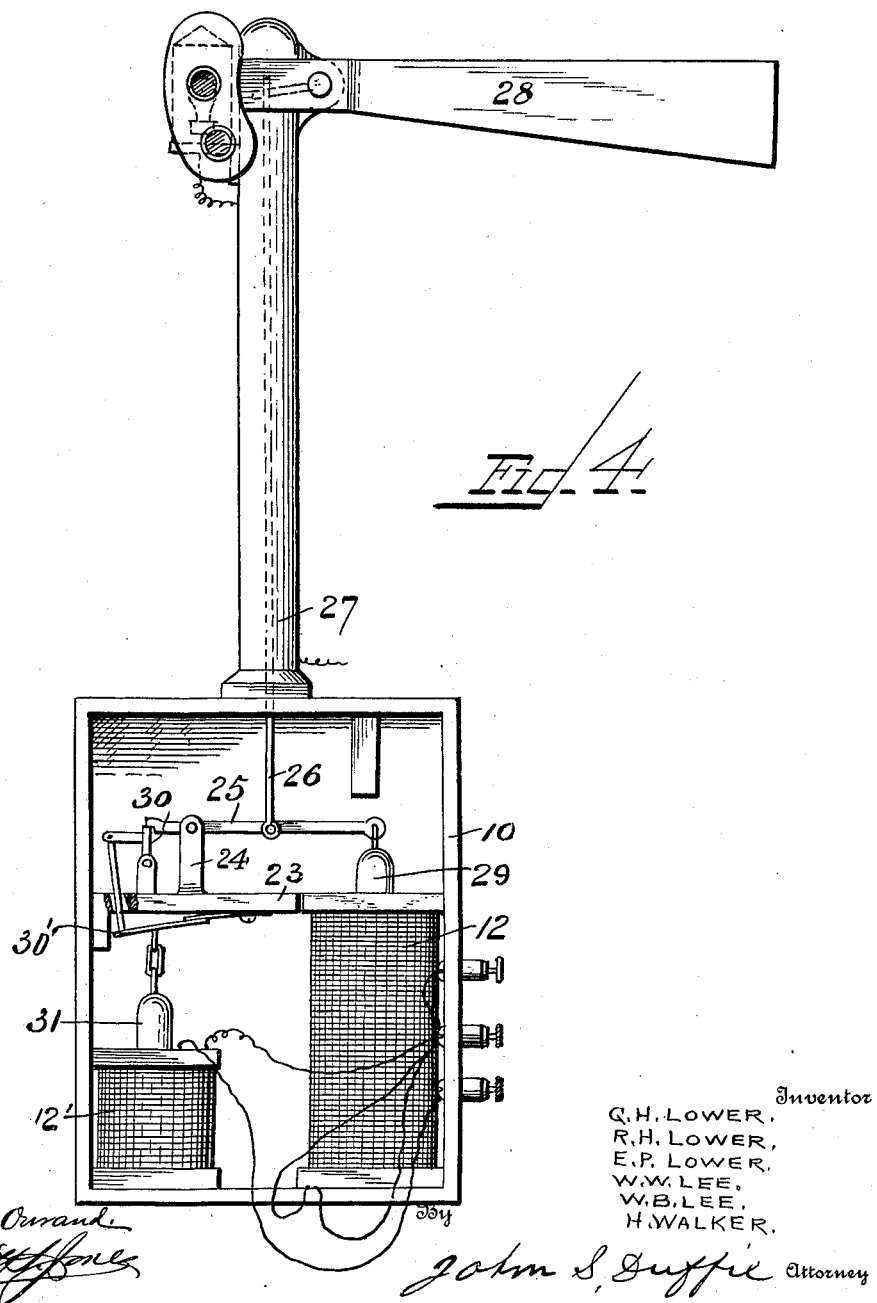

In the accompanying drawings, Figure 1 is a top plan view of a single railway-track with switches and contacts along one side of same, with semaphores or signals rising from said contacts, feed-wires, and switch-wires. Fig. 2 is a perspective view of a section of a railway-track, showing the switch, contact-casing, semaphore-casing, and semaphore. Fig. 3 is a top plan view of a section of a railway-track and one of the switches and contacts used in the invention. Fig. 4 is an elevation of the casing containing the mechanism which operates the semaphore and the semaphore in elevation mounted on said casing. Fig. 5 is a perspective view of a section of a railway-track, crossed by a road or street, switch, contact-box, road-gate, and semaphore. Fig. 6 is a cross-sectional view of Fig. 3 on the line $x\ x$.

In illustrating the operation of this invention we show four signals in a "block," and for the purpose of explanation we will suppose the block begins at signal A and as the train goes east it, with wire 15, sets signal B to "safety" and signal C to "danger" and at the same time sets signal A to "danger." When we operate signal B to "danger," we at the same time operate D to "danger," A to "safety," and C to "safety." When the train goes west, the operation of the signals on the left side of the track going west are exactly the reverse of the operation above described.

For a more particular description of the operation of our invention we will say that no matter whether the train is going east or west the switches 2 are operated and the contacts are made. When the contact is made at block A, wire No. 15, as shown in Fig. 1, sets B to "safety" by running into coil 12', block B, and C to "danger" by running into coil 12, block C, and said contact with wire 41 sets A to "danger" by running into coil 12, block A. Wire No. 14' is primary wire, carrying two thousand two hundred volts, and wire No. $14^2$ is the same. Wires No. $14^3$ and 17 are secondary wires. Nos. 14³ connect with the upper primary wire 14', and wires 17 connect with the lower primary wires 14². Nos. 2, 3, 4, 5, 6, and 7 are circuit-wires. Wire 15 starting at A puts B to "safety," passing through small coil 12' to wire 14³. The wires from coils 12 to 12' are unit-wires and run back to wires 14³, and wires 14³ connect with the upper primary wire 14'.

The above description of the operation of our invention is the usual manner of operating the signals; but it will be understood by any competent electrician that the wires may be so constructed as to operate the signals in any way desired.

In addition to the signals used on the railroad-track for the purpose of notifying the engineer this invention is also constructed so that it will by the same mechanism operate gates at desirable points—for instance, at roads and street-crossings—to notify the public.

Our invention is described as follows:

The numeral 1 represents the railway-track, and 2 the switch. The switch 2 is provided with two bolts 3 and 4, the bolt 3 being fastened near one end of the switch and the bolt 4 at the other end of the switch.

When the train is going east, the contact mechanism 6 will be operated, and when it is going west the contact mechanism 5 will be operated. When the train is going east, the contact 6, having three contact-points, is operated, and thereby operates the signal, setting it to "danger" and locking it, and in going west the contact 5, having three contact-points, is operated, setting it to "danger" and locking it, and the same operation puts down two more signals and one more signal up and locking the last-mentioned signal.

Each one of the bolts 3 and 4 and insulated bars 3' and 4' of the contacts 6 and 5 are operated by coil-springs 7. To assure sufficient contact, or, in other words, to keep the contact from being too suddenly released, each is provided with an air-valve 8. When the contact is made, the circuit is closed, vitalizing the wires 9. Situated some distance from the track and opposite these contacts just described is the signal-mechanism casing 10. This casing contains two coils 12 and 12', properly connected to wires. One of the three contact-wires 11, block A, is connected to the coil 12 and raises the signal and also runs back and operates the rear signal to "safety." The wire 16 of block B runs forward and operates the signal C to "safety" and the signal D to "danger," and A and C to "safety," and so on and so on. The wire 14, block A, goes direct to the feed-wire 14', and the wire 17 also goes to the feed-wire 14². Wires 18 and 19 are used for lighting stations, and wires that run through the cable 20 operate signals on the opposite side of the track.

The signal is operated as follows: A platform 23 extends from the coil 12 to the opposite side of the casing 10. Situated on the platform is a bearing 24, in which is pivoted a lever 25. To the long end of the lever is pivoted a rod 26, which passes up through a pipe 27, which operates the signal-blade 28. When the blade is up, a red light is shown; when it is down, a green light is shown. To the extreme end of the long end of the lever is a laminated-steel plunger 29, and when the electricity is on said plunger is pulled down, which pulls down the rod 26 and raises the blade. The said blade is locked in this position by a locking device 30, locked by the spring 30' and unlocked by a coil 12' and laminated-steel plunger 31, actuated by electricity.

All wires and cables used in this invention are insulated and protected by proper casings.

Having described our invention, what we claim as new, and desire to secure by Letters Patent, is—

1. In an electric automatic block-signal system for railways, the combination with the track of an operating-switch; a rod secured near one end of said switch and passing into a contact-casing; an insulated bar, passing through the inner end of said rod; three or more contact-wires, hinged in said casing, and adapted to be brought in contact with the circuit of vitalized wires by means of the insulated cross-bar pressing against them; a coil-spring, working around said rod, and adapted to release the contact; an air-pump, operating with said rod and coil-spring to insure sufficient length of contact; a case containing a large coil in one side, and a small coil in the other side; a bridge seated on the top of said large coil, and extending across the case; a tube, vertically mounted on said case, and carrying on its upper end an electric light; a semaphore-blade, hinged to the upper end of said tube, and adapted to show a safety-light when down and a danger-light when up; a lever, pivoted to, and above said bridge; a rod, its lower end secured to the long end of said lever, its upper end to said blade and adapted to operate it; a laminated-steel plunger, secured to the extreme part of the long end of the lever, and immediately above said large coil; a lock, adapted to lock the short end of said lever up when the said blade is up; a spring, throwing the said lock in locking position, and a laminated-steel plunger, secured to said spring immediately over said small coil, said blade adapted to be thrown up by the first-mentioned coil and plunger, and to be unlocked by the second-mentioned coil and plunger, said signal device operated by a system of electrovitalized wires, said signal situated near the track going east, substantially as shown and described and for the purposes set forth.

2. In an electric automatic block-signal system for railways, the combination with a track of an operating-switch; a rod, secured in one end of said switch, and passing into a contact-casing; an insulated bar, passing through the inner end of said rod; three or more contact-wires, hinged in said casing adapted to be brought in contact with the circuit of vitalized wires by means of the insulated cross-bar pressing against them; a coil-spring, working around said rod, and adapted to release the contact; an air-pump, operating with said rod and coil-spring to insure sufficient length of contact; a case, containing a large coil in one side, and a small coil in the other side; a bridge seated on the top of said large coil, and extending across the case; a tube, vertically mounted on said case, carrying on its upper end an electric light; a semaphore-blade, hinged to the upper end of said tube, and adapted to show a safety-light when down and a danger-light when up; a lever, pivoted to, and above said bridge; a rod, its lower end secured to the long end of said lever, its upper end to said blade, and adapted to operate it; a laminated-steel plunger, secured to the extreme part of the long end of the lever, and immediately above said large coil; a lock, adapted to lock the short end of said lever up when the said blade is up; a spring, throwing the said lock in locking position, and a laminated-steel plunger, secured to said spring and immediately over said small coil, said blade adapted to be thrown up by the first-mentioned coil and plunger, and to be unlocked by the second-mentioned coil and plunger, said signal device operated by a system of electrovitalized wires, said signal situated near the track going west, substantially as shown and described and for the purposes set forth.

3. In an electric automatic block-signal system for railways, the combination with the track of operating-switches; rods secured, one to each end of said switches, and passing into contact-casings; insulated bars, passing through the inner ends of said rods; six or more contact-wires hinged in said casings, adapted to be brought in contact with the circuit of vitalized wires by means of the insulated cross-bars pressing against them; coiled springs, working around said rods, and adapted to release the contacts; air-pumps, operating with said rods and coiled springs to insure sufficient length of contact; casings, each containing a large coil in one side, and a small coil in the other; bridges, one seated on the top of each of said large coils, and extending across the case; a tube vertically mounted on each of said cases, each carrying on its upper end a light; a semaphore-blade, hinged to the upper end of each of said tubes, each adapted to show a safety-light when down, and a danger-light when up; levers, pivoted to, and above said bridges; rods, their lower ends secured to the long ends of said levers, their upper ends to said blades and adapted to operate them; laminated-steel plungers, one secured to the extreme part of the long ends of said levers, and immediately above said large coils; locks, adapted to lock the short ends of said levers up when the said blades are up; springs, throwing said blades in locking position, and laminated-steel plungers, secured to said springs immediately over said small coils, said blades to be thrown up and locked by the first-mentioned coils and plungers, and to be unlocked by the second-mentioned coils and plungers, said signal devices adapted to be operated by a system of electrovitalized wires, said signals being situated on both sides and near the track, substantially as shown and described and for the purposes set forth.

4. In an electric automatic block-signal system for railways, signals situated on both sides of a railway, adapted to be operated by the flange on the wheels of a moving train; operating-switches; a system of vitalized wires and contacts, extending from said switches, operating-signals on both sides of the track, said wires vitalized by an alternating current produced by parallel machines at intervals along the track, substantially as shown and described and for the purposes set forth.

In testimony whereof we affix our signatures in the presence of two witnesses.

GEORGE H. LOWER.
ROBERT H. LOWER.
EDWARD P. LOWER.
WINFREY W. LEE.
WILLIAM B. LEE.
HERBERT WALKER.

Witnesses:
JOHN R. McCLENDON,
C. G. BUSH.